William B. Pietenpol
Frank C. Walz

INVENTORS.

Patented Apr. 5, 1932

1,852,366

UNITED STATES PATENT OFFICE

WILLIAM B. PIETENPOL AND FRANK C. WALZ, OF BOULDER, COLORADO

TERMINAL FOR STORAGE BATTERIES

Application filed April 1, 1926. Serial No. 98,978.

Our invention relates to improvements in terminals for storage batteries and its primary object resides in the provision of a connection between the terminal of a storage battery and a conductor of a circuit having its source of electricity in the battery, which is rendered non-corrosive by a simple and efficient method of insulating its metal current-transmitting parts.
Another object of the invention is to provide a connection of the above described character, permitting of a rotary motion of the circuit wire whereby it may turn to different positions without detrimental effect upon its conductive relation to the terminal of the battery.

Still another object of the invention resides in the provision of a non-corrosive, self-adjusting and readily separative connection for conductors of electricity which is applicable to terminal posts of standard storage batteries; and still another object is to provide a novel method of fastening a metallic terminal member to either the battery post or the circuit wire, and further objects reside in details of construction and a novel and practical arrangement of parts as will fully appear in the course of the following description.

Figure 1:
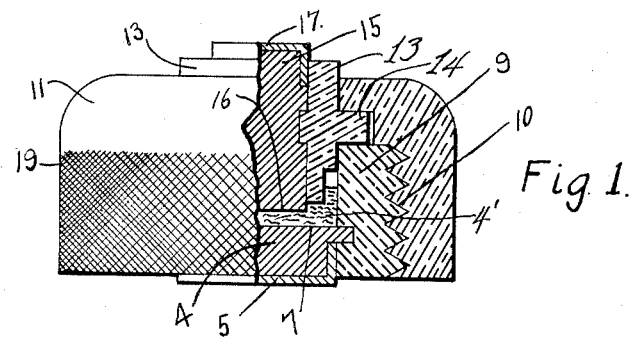
Figure 2:
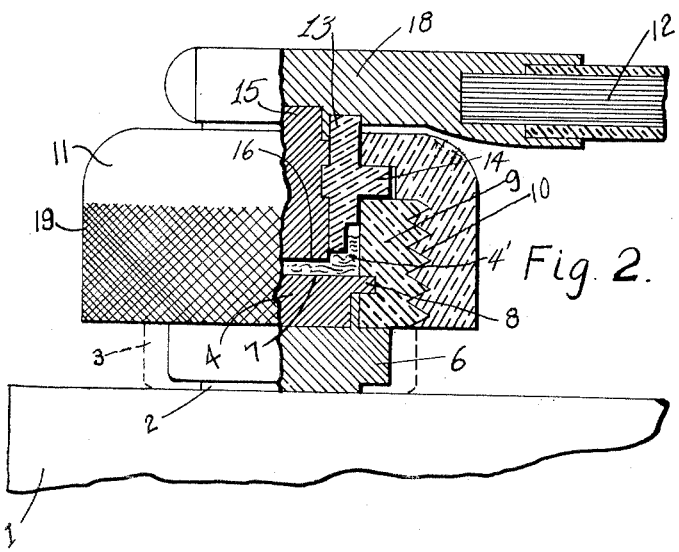
Figure 3:
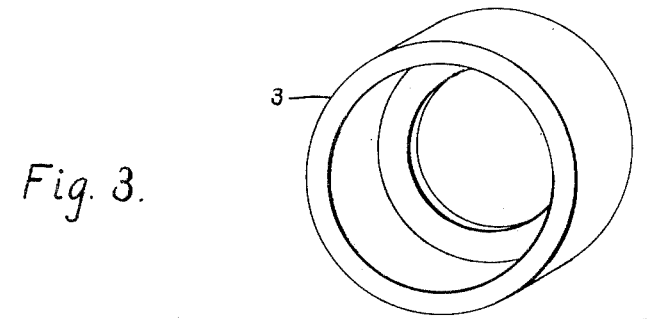

In the accompanying drawings in the several views of which like parts are similarly designated, Figure 1 represents a sectional elevation of the connection, Figure 2 a similar view of the connection in its operative relation to the terminal post of a storage battery and a conductor of electricity, and Figure 3 a perspective view of a mold employed to apply the connection to the terminal post.

Referring further to the drawings, the numeral 1 designates the upper portion of a storage battery of conventional construction provided with a terminal post 2 for the connection of its electrodes with a circuit-wire such as that designated in the drawings by the reference character 12.

The connection by which in accordance with the present invention, the circuit wire 12 is held in conductive relation to the terminal post 2, comprises two metal conductor-members 4 and 15 brought into electral correlation by a body of mercury 4' contained in a non-conductive and non-corrosive coupling-element.

The member 4 which, in practise, is connected with the terminal post of the battery, consists of a cylindrical button provided with a circumferential flange 8, for its connection with the coupling element; and the other member 15 to which the conductor 12 is fastened, is composed of a circumferentially grooved metal stud 15 and a surrounding collar 13 of non-conductive material, which has a flange 14 for its rotary support in correlation to the member 4.

The collar 13, being made of rubber or other non-conductive material of like character, is molded around the stud 15 and by entering the circumferential groove of the stud, becomes a permanent part thereof. The extremities of the stud project outside the collar for their connection with the circuit wire and the body of mercury in the coupling element as will hereinafter be more fully described.

The coupling-element is composed of an annular, externally threaded inner part 9 and an internally threaded outer part 11 which in the operation functions as a nut by which the circuit wire is removably connected to the post of the battery.

The part 9 of the coupling element is made of rubber molded around the button 4 and permanently connected with the same by medium of the flange 8; and the nut-part 11, likewise made of non-conducting material, has an inwardly projecting double-shouldered rim which in conjunction with the upper end of the part 9, provides an annular recess to admit the circumferential flange 14 of the collar 13 around the conductive member 15 of the circuit wire and thereby support said member free for rotation to adjust the position of the conductor 12 relative to the battery.

The nut 11 is externally knurled as at 19 to facilitate its adjustment. The conductor-members 4 and 15 of the connection mounted as hereinabove described, in axial alinement, are spaced from each other within the coupling element, and placed in conductive connection with each other by means of the before mentioned body of mercury which is contained within the hollow inner part 9 of the element.

In order to provide for a reliable contact of the metal members 15 and 4 with the mercury, the extremities thereof within the coupling-element may be amalgamated with mercury as at 7 and 16.

The method of securing the contact members 4 and 15 of the connection, to the terminal post of the battery and the conductor 12, respectively, is as follows:

The post 2 is smoothed and otherwise shaped for its insertion through an opening in the bottom of a cup-shaped mold 3 shown in detail in Figure 3 and indicated in broken lines in Figure 2.

The body of the button 4 below the flange 8 has a cap 5 of lead, partially within the part 9 of the coupling-element, and partially projecting below the same.

The mold 3 is filled with molten lead and before this lead is cooled to a hardened condition, the connection is placed upon the mold with the projecting portion of the cap immersed in the molten lead container therein.

The lead, upon solidification, welds the metal button 4 to the terminal 2 and the mold which is made of paper or other cheap and easily destroyed material, is subsequently removed by breaking it away from the hardened lead.

To provide for the connection between the member 15 and the circuit wire 12, the extremities thereof are inserted through openings of a mold interiorly shaped in conformity with the part 18 shown in Figure 2 of the drawings, the outer end of the member 15 being covered by a cap of lead 17, which extends partially within the non-conductive collar 13, and partially outside the same.

The mold is filled with lead and upon solidification thereof the mold, which like the other, is made of destructible material, is removed by breaking it away from the hardened lead.

It is desirable that the lead connection between the member 15 and the conductor 12, encompass a portion of the insulating envelop of the wire, so as to prevent corrosion of the latter at that point.

Having thus described the construction, arrangement and method of application of our improved connection, it will be evident that by reason of the non-corrosive properties of the parts of the coupling-element and the lead used to connect the conductor-members 4 and 15 to the terminal post of the battery and the circuit-wire, respectively, and owing to the complete insulation of the end portions of the members at which they are connected to the post and the wire, and the fact that their ends are amalgamated and emersed in mercury corrosion of the only parts of corrodible metal included in the construction is completely avoided.

The connection will, therefore, retain its efficiency for an indefinite period without attention, and the rotary arrangement of its parts permits of the conductor 12 being turned to any desired position with relation to the battery.

It is furthermore to be observed that the wire is readily detached from the battery by merely unscrewing the nut 11 from the relatively stationary part 9, and that the simple method of attaching the conductor member 4 to the battery post permits of applying the connection to any battery of conventional construction without the use of tools or appliances other than the simple mold.

The connection between the circuit wire and the other conductive member is made with equal facility and the practically non-corrosive mercury provides an efficient agent to maintain the current transmitting relation between the two metal members under all conditions while permitting of the movement of the one relative to the other.

The movability of the member 15 relative to the coupling element of the connection not only permits of the wire 12 being turned in different directions, but is also of value in that it prevents the nut 11 from being loosened by vibration of a vehicle on which the battery is mounted or by accidental displacement of the wire, and should it be desired to hold the wire against rotation, the collar 13 and the portion of the inner part 9 of the coupling element may be formed to a non-circular fit with relation to each other.

Having thus described our invention, what we claim and desire to secure by Letters Patent is:

1. A battery terminal having a chamber and comprising upper and lower corrodible conductive members, the lower member providing a bottom for the chamber, an externally threaded, non-conductive wall member for the chamber, a non-conductive collar on the upper member, supported on the wall member and in turn supporting said upper member, a body of conductive liquid in the chamber contacting with the conductive members, portions of said corrosive conductive members being exteriorly of the chamber, non-corrodible coverings for said portions, and a nut in engagement with the threads on the wall member, the nut having a shoulder in contact with the collar and holding same against displacement.

2. A battery terminal having a chamber and comprising upper and lower corrodible conductive members, the lower member providing a bottom for the chamber, an externally threaded, non-conductive wall member for the chamber, a non-conductive collar on the upper member, having a flange supported on said wall member, whereby to support said upper member, a body of conductive liquid in the chamber contacting with the conductive members, portions of said corrodible conductive members being exteriorly of the chamber, non-corrosive coverings for said portions, and a nut in engagement with the threads on the wall member, the nut engaging said flange and holding same against displacement.

3. A battery terminal comprising, a housing including a non-conductive wall member defining a chamber, upper and lower corrodible conductive members extending in the chamber and outside the housing, the lower member providing a bottom for the chamber, a non-conductive collar for the upper member, resting upon the non-conductive wall member, whereby to support the upper corrodible conductive member and close the chamber, means for holding the collar against displacement on the wall member, a body of conducting liquid in the chamber contacting with the parts of the corrodible conductive members exposed within the chamber, and connections of non-corrosive metal covering the parts of the corrodible conductive members outside the housing.

4. A battery terminal comprising a housing including a non-conductive wall member defining a chamber, a lower corrodible conductive member providing a bottom for the chamber, a non-conductive closure for the chamber bearing on the wall member, means for holding the closure against displacement on the wall member, an upper corrodible conductive member extending through the closure into the chamber, connections of non-corrosive metal for the conducting members, outside the housing, and a body of conducting liquid covering the parts of the conducting members inside the chamber.

5. A battery terminal comprising a housing including a non-conductive wall member defining a chamber, upper and lower corrodible conductive members extending in the chamber and outside the housing, the lower member providing a bottom for the chamber, a non-conductive collar for the upper member resting upon the non-conductive wall member, whereby to support the upper corrodible conductive member and close the chamber, adjustable means for holding the collar against displacement on the wall member, the upper conductive member and its collar being rotatable in the housing, subject to adjustment of the holding means, a body of conducting liquid in the chamber contacting with the parts of the corrodible conductive members exposed within the chamber, and connections of non-corrosive metal covering the parts of the corrodible conductive members outside the housing.

6. A battery terminal connection comprising a female member providing a mercury well, the bottom surface of which is conductive, a body of mercury in the well, covering said bottom, a male member having a conductive end in the body of mercury, and a coupling-member for holding the male member in its said position relative to the female member, the wall of the well being non-metallic throughout its extent, whereby, when the male member is withdrawn, all exposed surface of the female member is acid-proof.

7. A battery terminal connection comprising a female member providing a mercury well, the bottom surface of which is conductive, a body of mercury in the well, covering said bottom, a male member having a small conductive extremity exposed in the body of mercury, a coupling-member for holding the male member in its said position relative to the female member, and a conductive body to connect the male member with a conductor of electricity, the male member being composed of a metal conductive part having an end engaging with the conductive body, and a non-metallic collar completely covering the surface of the metal conductive part between the conductive body and the said exposed extremity of the part, which normally extends into the body of mercury, whereby when the male part is withdrawn from the female part the major portion of the metal conductive part remains protected from acid by a non-metallic covering.

In testimony whereof, we hereunto affix our signatures.

WILLIAM B. PIETENPOL.
FRANK C. WALZ.